United States Patent
Hegna et al.

(10) Patent No.: US 10,338,255 B2
(45) Date of Patent: Jul. 2, 2019

(54) NOISE ATTENUATION

(71) Applicant: PGS Geophysical AS, Oslo (NO)

(72) Inventors: Stian Hegna, Oslo (NO); Tilman Kluver, Oslo (NO)

(73) Assignee: PGS Geophysical AS, Oslo (NO)

( * ) Notice: Subject to any disclaimer, the term of this patent is extended or adjusted under 35 U.S.C. 154(b) by 210 days.

(21) Appl. No.: 15/412,135

(22) Filed: Jan. 23, 2017

(65) Prior Publication Data

US 2017/0299746 A1    Oct. 19, 2017

Related U.S. Application Data

(60) Provisional application No. 62/323,098, filed on Apr. 15, 2016.

(51) Int. Cl.
| | | |
|---|---|---|
| *G01V 1/36* | (2006.01) | |
| *G01V 1/28* | (2006.01) | |
| *G01V 1/38* | (2006.01) | |

(52) U.S. Cl.
CPC ............... *G01V 1/364* (2013.01); *G01V 1/38* (2013.01); *G01V 2210/324* (2013.01); *G01V 2210/3246* (2013.01); *G01V 2210/56* (2013.01)

(58) Field of Classification Search
CPC .... G01V 1/364; G01V 1/282; G01V 2210/56; G01V 2210/324; G01V 2210/3246; G01V 1/38
USPC ......................................................... 367/24
See application file for complete search history.

(56) References Cited

U.S. PATENT DOCUMENTS

| | | | |
|---|---|---|---|
| 4,437,176 A | | 3/1984 | Mack |
| 4,665,510 A | * | 5/1987 | Foster .................... G01V 1/362 367/21 |
| 4,884,248 A | * | 11/1989 | Laster .................... G01V 1/364 367/73 |
| 5,293,352 A | | 3/1994 | Chambers |
| 5,971,095 A | | 10/1999 | Ozbek |
| 6,295,505 B1 | * | 9/2001 | Assa ...................... G01V 1/364 702/17 |
| 6,735,527 B1 | * | 5/2004 | Levin ..................... G01V 1/36 702/14 |
| 7,584,057 B2 | * | 9/2009 | Ozbek .................... G01V 1/364 702/17 |
| 7,800,977 B2 | * | 9/2010 | Grion .................... G01V 1/364 367/21 |
| 9,207,349 B2 | * | 12/2015 | Cambois ................ G01V 13/00 |
| 2007/0064535 A1 | * | 3/2007 | Burnstad ................ G01V 1/36 367/73 |
| 2012/0188845 A1 | * | 7/2012 | Jeffryes ................. G01V 1/005 367/46 |

FOREIGN PATENT DOCUMENTS

EP         0515189         11/1992

* cited by examiner

*Primary Examiner* — Daniel L Murphy

(57) ABSTRACT

Noise can be attenuated in marine seismic data from a marine seismic survey. A first near-continuous measurement of a wavefield and a second near-continuous measurement of the wavefield recorded from a marine seismic survey can be equalized, a coherent portion of the equalized second near-continuous measurement can be collapsed, and a noise model can be derived. The noise model can be subtracted from the second near-continuous measurement.

29 Claims, 11 Drawing Sheets

NOISE ATTENUATION

CROSS-REFERENCE TO RELATED APPLICATIONS

This application claims priority to U.S. Provisional Application 62/323,098, filed Apr. 15, 2016, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine seismic survey, a marine seismic survey vessel tows one or more sources below the water surface and over a subterranean formation to be surveyed for mineral deposits. Receivers may be located on or near the seafloor, on one or more streamers towed by the marine seismic survey vessel, or on one or more streamers towed by another vessel. The marine seismic survey vessel typically contains marine seismic survey equipment, such as navigation control, source control, receiver control, and recording equipment. The source control may cause the one or more sources, which can be air guns, marine vibrators, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

DETAILED DESCRIPTION

This disclosure is related generally to the field of marine seismic surveying. For example, this disclosure may have applications in marine seismic surveying, in which one or more source elements are used to generate wave-fields, and sensors (towed or ocean bottom) receive energy generated by the source elements and affected by the interaction with a subsurface formation. The sensors thereby collect marine seismic survey data, which can be useful in the discovery and/or extraction of hydrocarbons from subsurface formations.

Figure 1:
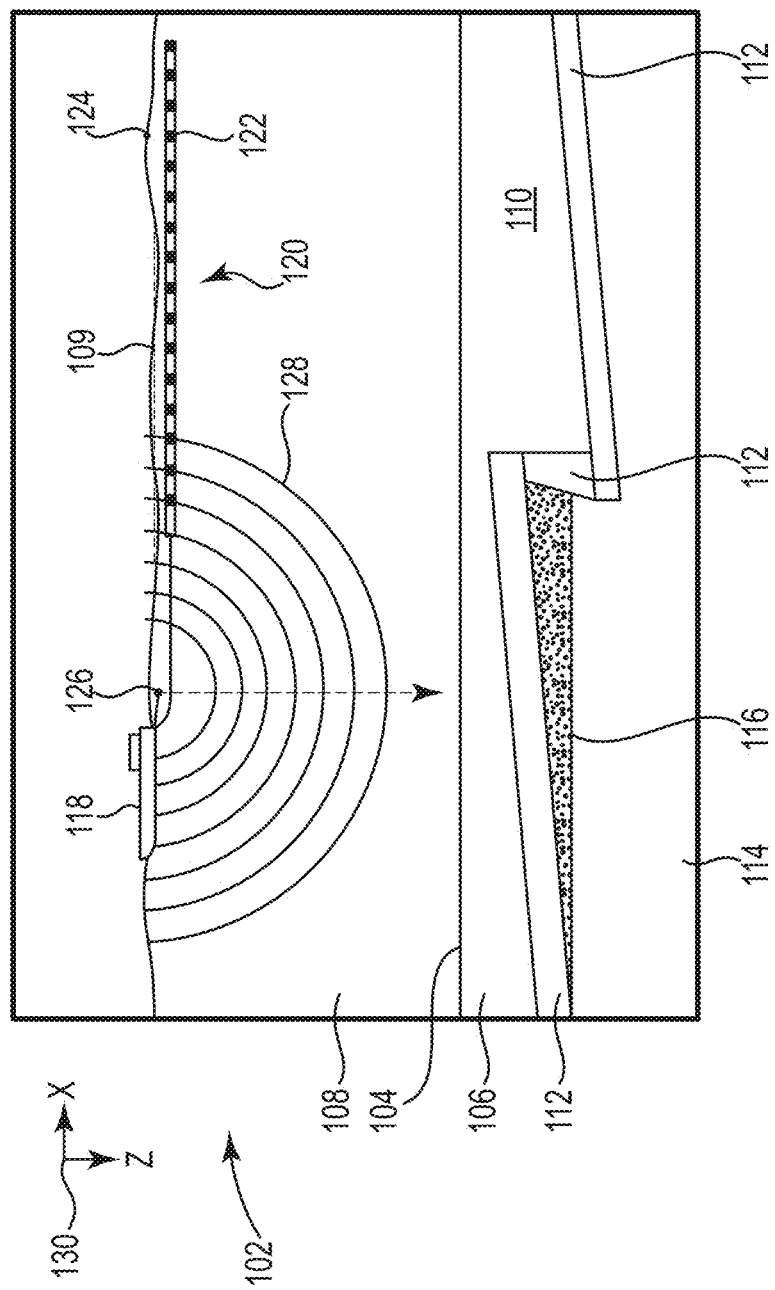
FIG. 1 illustrates an elevation or xz-plane view of marine seismic surveying in which acoustic signals are emitted by a source for recording by receivers.

A dual-sensor or multi-component towed streamer, such as the streamer 120 illustrated in FIG. 1, can be used for a marine seismic survey. For example, a streamer can include at least two types of sensors that can measure two different components of a wavefield. For example, up-going and down-going wavefields can be separated through scaled or weighted summation of the measured components. Separating the wavefields into up- and down-going components can enable the application of techniques such as up-/down-deconvolution or Separated Wavefield Imaging (SWIM).

Marine seismic survey data can comprise a plurality of measurements. A measurement can comprise a coherent portion and a noise portion (hereinafter referred to as noise). The coherent portion is the portion of the measurement that includes data, which may be referred to as desired data. The noise portion is the remaining portion of the measurement. The noise portion may be referred to as undesired data, such as random data. The plurality of measurements can include, but is not limited to, a pressure measurement, a particle motion in an x-direction, a particle motion in a y-direction, and a particle motion in a z-direction. The particle motion measurements can be acceleration measurements. Accordingly, a marine seismic survey can be performed using multiple sensors where a different type of sensor is used to measure a different characteristic of a wavefield. For example, a first sensor and a second sensor can be used in tandem where the first sensor is configured to measure a different characteristic of a wavefield than the second sensor. The first sensor and the second sensor can be used in tandem such that they complement each other. However, a measurement from one of the two sensors may be contaminated with noise.

In the example of a marine seismic survey, a streamer comprising both a pressure sensor, such as a hydrophone, and a particle motion sensor, such as a geophone, can be used but the particle motion sensors may be contaminated with noise, especially in the low frequency end. In some previous approaches, up-going and down-going pressure wavefields, $P_u$ and $P_d$, respectively, may be calculated from a measured pressure wave-field P and vertical velocity wavefield component $V_z$ and may be expressed in the frequency-wavenumber domain as follows:

$$P_u = \frac{1}{2}\left[P - \frac{\rho\omega}{k_z}V_z\right] \quad (1)$$

and $$P_d = \frac{1}{2}\left[P + \frac{\rho\omega}{k_z}V_z\right] \quad (2)$$

where ω is angular frequency, ρ is the density of water, and $k_z$ is a vertical wavenumber in a z-direction, which may be a depth direction. The vertical wavenumber k can be given by:

$$k_z = \sqrt{\left(\frac{\omega}{c}\right)^2 - k_x^2 - k_y^2} \quad (3)$$

where c is the speed of sound in water, $k_x$ is a horizontal wavenumber in an x-direction, which may be an inline direction, and $k_y$ is the horizontal wavenumber in a y-direction, which may be a crossline direction.

In some previous approaches, noisy low frequency particle motion measurements may be replaced with a particle velocity estimated from pressure measurements. A vertical particle velocity may be calculated from pressure measurements using the following expression:

$$V_z' = -\frac{k_z}{\rho\omega}\frac{1 - re^{-i2zk_z}}{1 + re^{-i2zk_z}}P \quad (4)$$

where $V_z'$ is an estimated vertical velocity field, P is a measured total pressure field, and r is a reflection coefficient of a water surface. A low frequency part of a measured vertical particle velocity may be replaced with a low frequency part of an estimated vertical particle velocity from a total pressure as follows:

$$V_z^{reb} = F_L V_z' + F_H V_z \quad (5)$$

where $F_L$ and $F_H$ are corresponding low-pass and high-pass filters, respectively, such that $$F_L + F_H = 1 \quad (6)$$

The low-/high-pass corner frequencies may be set such that each is below a first ghost notch above 0 Hertz (Hz) in a pressure field. At a zero degree emergent angle, the low-/high-pass corner frequencies may be below $$\frac{c}{2z}\text{Hz}.$$

Alternatively, $F_L$ and $F_H$ may be frequency dependent weight functions, wavenumber dependent weight functions, or frequency and wavenumber dependent weight functions. $F_L$ and $F_H$ may be derived based on a signal to noise ratio. The output from equation (5) may be used as an input to equations (1) and (2) for a wavefield separation.

In some previous approaches, low frequency parts of a second near-continuous measurement, such as a particle motion measurement, may be replaced with estimates calculated from a first near-continuous measurement, such as a pressure measurement, such that assumptions with regards to a water surface may be required. In contrast, at least one embodiment of the present disclosure can utilize more of the data recorded by a second sensor corresponding to a second near-continuous measurement, even if the second sensor is more susceptible to noise than a first sensor. For example, more of the data recorded by particle motion sensors towards lower frequencies can be utilized to derive a noise model, a signal model, or both a noise model and a signal model. The noise model or the signal model can then be used to attenuate noise in the particle motion measurement.

Embodiments can include equalizing a first near-continuous measurement of a wavefield and a second near-continuous measurement of the same wavefield. A coherent portion of the equalized second near-continuous measurement for the duration of a marine seismic survey can be collapsed to a spike at approximately a single time point of the marine seismic survey. A time window can be placed around the spike. To isolate the coherent portion from noise in the second near-continuous measurement and derive a noise model, the collapsed coherent portion within the time window can be muted. The resulting noise model can then be subtracted from the second near-continuous measurement thereby attenuating the noise in the second near-continuous measurement. To isolate the noise from the collapsed coherent portions in the second near-continuous measurement and derive a signal model, the noise outside the time window can be muted leaving the collapsed coherent portion within the time window.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine seismic surveying in which acoustic signals are emitted by a source 126 for recording by receivers 122. Processing and analysis of the data can be performed in order to help characterize the structures and distributions of features and materials underlying the solid surface of the earth. FIG. 1 illustrates a domain volume 102 of the earth's surface comprising a solid volume 106 of sediment and rock below the solid surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 110, an uplifted rock layer 112, second, underlying rock layer 114, and hydrocarbon-saturated layer 116. One or more elements of the solid volume 106, such as the first sediment layer 110 and the first uplifted rock layer 112, can be an overburden for the hydrocarbon-saturated layer 116. In some instances, the overburden may include salt.

FIG. 1 illustrates an example of a marine seismic survey vessel 118 equipped to carry out marine seismic surveys. In particular, the marine seismic survey vessel 118 can tow one or more streamers 120 (shown as one streamer for ease of illustration) generally located below the water surface 109. The streamers 120 can be long cables containing power and data-transmission lines (electrical, optical fiber, etc.) to which receivers may be connected. In one type of marine seismic survey, each receiver, such as the receiver 122 represented by the shaded disk in FIG. 1, comprises a pair of sensors. A first sensor of the pair of sensors can be a hydrophone such that a first measurement of the wavefield 128 is a pressure measurement. For example, the first measurement can be variations in pressure. A second sensor of the pair of sensors can be a motion sensor such that a second measurement of the wavefield 128 is a particle motion measurement. For example, the second measurement can be particle displacement within the water from detecting particle motion variation, such as velocities or accelerations. Data from one of the first and second measurements can be used to derive a noise model, a signal model, or both a noise model and a signal model. A noise model or a signal model can be used to attenuate noise in the other of the first and second measurements. Noise attenuation in accordance with at least one embodiment of the present disclosure can be based on a first measurement of a wavefield in parts of the spectra where a coherent portion of the first measurement is dominant over noise in the first measurement to predict and attenuate noise in a second measurement of the wavefield. The first measurement and the second measurement can be recorded continuously or near-continuously.

As used herein, "near-continuous" can include without meaningful breaks in the seismic recording. As would be understood by one of ordinary skill in the art with the benefit of this disclosure, operational circumstances can cause intermittent gaps in records (due to equipment failure, etc.), and "near-continuous recording" should be read to include records with intermittent or periodic gaps, whether planned or unplanned as well as records without intermittent or periodic gaps, thus including "continuous records." For simplicity, the term "near-continuous" and "near-continuously" will be used herein and do not exclude "continuous" or "continuously".

The streamers 120 and the marine seismic survey vessel 118 can include sophisticated sensing electronics and data-processing facilities that allow receiver readings to be correlated with absolute positions on the water surface and absolute three-dimensional positions with respect to a three-dimensional coordinate system. In FIG. 1, the receivers along the streamers are shown to lie below the water surface 109, with the receiver positions correlated with overlying surface positions, such as a surface position 124 correlated with the position of receiver 122. The marine seismic survey vessel 118 can also tow one or more sources 126 that produce acoustic signals as the marine seismic survey vessel 118 and streamers 120 move across the water surface 109. Sources 126, streamers 120, or sources 126 and streamers 120 may also be towed by other vessels, or may be otherwise disposed in fluid volume 108. For example, receivers may be located on ocean bottom cables or nodes fixed at or near the solid surface 104, and sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to seismic receivers located on at least one of a towed streamer, an ocean bottom receiver cable, or an array of nodes.

FIG. 1 illustrates an expanding, spherical acoustic signal, illustrated as semicircles of increasing radius centered at the source 126, representing a down-going wavefield 128, following an acoustic signal emitted by the source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic signals within the solid volume 106.

Although the following discusses an example where a first near-continuous measurement of a wavefield is a pressure measurement of the wavefield and a second near-continuous measurement of the wavefield is a particle motion measurement of the wavefield, one of skill in the art will appreciate that the first near-continuous measurement and the second near-continuous measurement can be any two near-continuous measurements of a wavefield. Additionally, although the convention of this disclosure refers to the second near-continuous measurement as being noisier, or having a lesser signal-to-noise ratio, than the first near-continuous measurement, one of skill in the art will appreciate that the first near-continuous measurement could be referred as being noisier, or having a lesser signal-to-noise ratio, than the second near-continuous measurement.

The first near-continuous measurement and the second near-continuous measurement can be equalized so that the first near-continuous measurement and the second near-continuous measurement are comparable. Equalizing the first near-continuous measurement and the second near-continuous measurement, for example, by applying an equalization operator to the first near-continuous measurement and the second near-continuous measurement, can achieve one or more corrections. These corrections can include, but are not limited to, correcting sensor responses, obliquities, or differences in ghost functions. Several approaches can be used to equalize the first near-continuous measurement and the second near-continuous measurement. In at least one embodiment, equalizing the first near-continuous measurement and the second near-continuous measurement can include estimating an up-going pressure field from a first sensor and a second sensor individually by deconvolving their respective ghost functions and sensor responses. Deconvolving can reverse the effects of convolution on recorded data, where convolution assumes that the recorded data is a combination of a reflectivity function and a source wavefield from a source. In at least one embodiment, equalizing the first near-continuous measurement and the second near-continuous measurement can include correcting the first measurement or the second measurement for an obliquity. In at least one embodiment, equalizing the first near-continuous measurement and the second near-continuous measurement can include cross-ghosting the first measurement and the second measurement, correcting a second sensor response to a first sensor response, and putting an obliquity of the second measurement onto the first measurement.

An equalized pressure measurement can be determined by applying an equalization operator to a pressure measurement as follows:

$$\tilde{P} = \frac{k_z}{\rho\omega}(1 - re^{-i2zk_z})F_{vel}P \quad (7)$$

where $\tilde{P}$ is the equalized pressure measurements including an obliquity $$\frac{k_z}{\rho\omega}$$

that is in the particle motion measurement $V_z$ due to the fact that the particle motion measurement $V_z$ is a vertical vector measurement, $(1-re^{i2zk_z})$ is an anticipated ghost function that is in the particle motion measurement $V_z$, $F_{vel}$ is a velocity filter that can range from the velocity of sound in water to slightly above the velocity of sound in water, and P is the measured pressure data. A Hanning taper can be applied to the velocity filter $F_{vel}$ to ensure that the evanescent region (beyond a 90 degree emergent angle) is filtered The equalized particle motion measurement can be determined by applying an equalization operator to the particle motion measurement as follows:

$$\tilde{V}_z = \frac{S_p}{S_{V_z}}(1 + re^{-i2zk_z})F_{vel}V_z \quad (8)$$

where $\tilde{V}_z$ is the equalized particle motion measurement, $S_p$ is a pressure sensor response, $S_{V_z}$ is a particle motion sensor response, $(1+re^{-i2zk_z})$ is an anticipated ghost function that is in the pressure sensor measurements, and $V_z$ is the particle motion measurement. The pressure sensor response $S_p$ and the particle motion sensor response $S_{V_z}$ can include any array response, for example, if analogue group forming has been applied.

A Rayleigh model can be used to derive a statistical reflectivity r of the water surface used in equations (7) and (8):

$$r = -e^{-2(\sigma\frac{\omega}{c}\cos\theta)^2} = -e^{-2(\sigma k_z)^2} \quad (9)$$

where σ is a root mean square (RMS) wave height. If appropriate ghost functions have been used for cross-ghosting and appropriate sensor responses have been used in equation (8), then the equalized pressure measurement will be related to the equalized particle motion measurement by a scalar such that:

$$\tilde{P} = \alpha\tilde{V}_z \quad (10)$$

where a is the scalar. A statistical ghost function and a mean receiver depth can be determined using the following cost function:

$$|\tilde{P} - \alpha\tilde{V}_z|^2 \quad (11)$$

Alternatively, the mean receiver depth can be determined from measured receiver depths, and RMS wave height σ can be determined from a standard deviation of the measured receiver depths.

Figure 2:
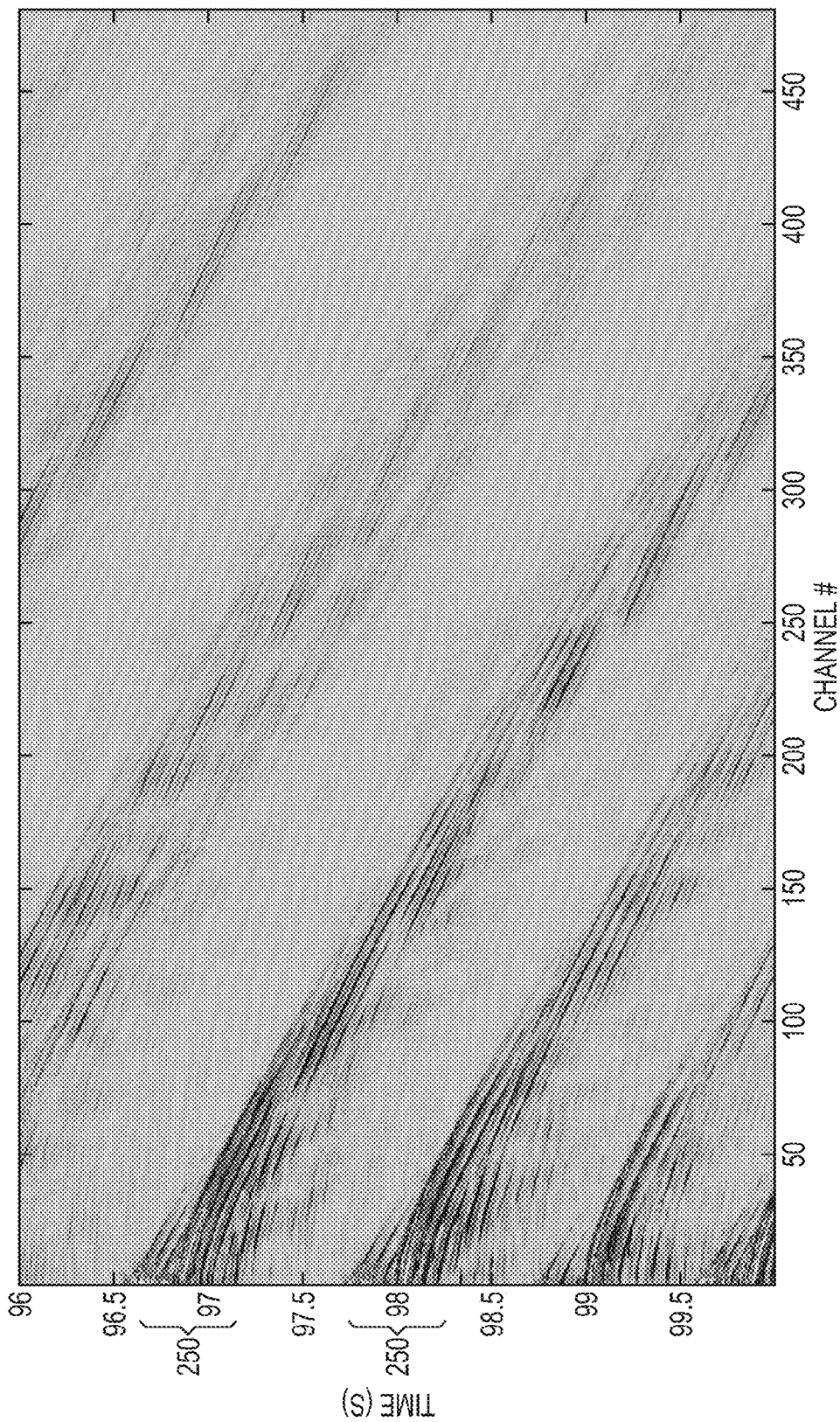
FIG. 2 illustrates a pressure measurement of a wavefield that has been equalized.

FIG. 2 illustrates a pressure measurement of a wavefield that has been equalized. In the example of FIG. 2, a ghost function corresponding to the particle motion measurement and an obliquity have been applied to the pressure measurement. The horizontal axis is a channel number corresponding to a pressure sensor. The vertical axis is the time when the pressure measurement was received by the pressure sensor where 0 seconds corresponds to the first pressure measurement of a marine seismic survey. Although only four seconds of a near-continuous marine seismic survey is shown (seconds 96 to 100), one of skill in the art will appreciate that a near-continuous marine seismic survey can have a duration of tens of thousands of seconds, for example, 20,000 seconds. The coherent portion of the equalized pressure measurement can include the portion of the equalized pressure measurement corresponding to activations of a seismic source, such as an air gun, which can be seen as dark bands 250.

Figure 3:
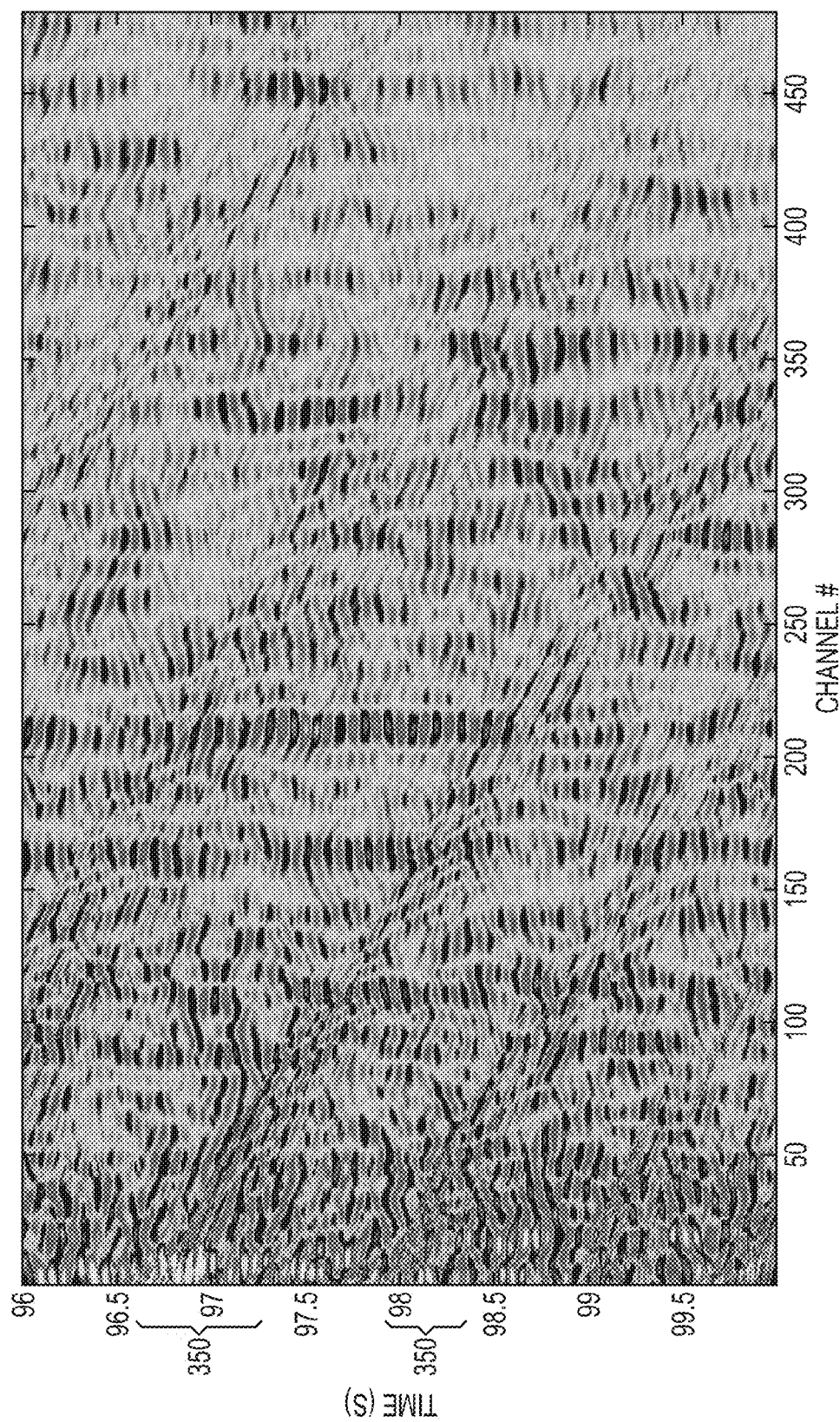
FIG. 3 illustrates a portion of a particle motion measurement of a wavefield from a near-continuous marine seismic survey.

FIG. 3 illustrates a portion of a particle motion measurement of a wavefield from a near-continuous marine seismic survey. The particle motion measurement in FIG. 3 is from the same near-continuous marine seismic survey and measures the same wavefield as the equalized pressure measurement in FIG. 2. The horizontal axis is a channel number corresponding to a particle motion sensor. The vertical axis is the time when the particle motion measurement was received by the particle motion sensor where 0 seconds corresponds to the first particle motion measurement of a marine seismic survey. The same four seconds of a near-continuous marine seismic survey is shown (seconds 96 to 100 as in FIG. 2). The particle motion measurement in FIG. 3 has been filtered with a 70-90 degree angle filter, the particle motion sensor response $S_{V_z}$ has been deconvolved, and a 4-8 Hz high-pass filter has been applied. At least one of the angle filter or the high-pass filter can be used to filter out an evanescent region of a pressure measurement or a particle motion measurement where noise cannot be predicted. By comparing FIG. 3 to FIG. 2, it can be seen that the particle motion measurement is noisier than the equalized pressure measurement. The coherent portion of particle motion measurement is not as visible as the coherent portion of the equalized pressure measurement because of the noise in the equalized particle motion measurement. For example, the portion of the equalized particle motion measurement corresponding to activations of a seismic source 350 in FIG. 3 are not as visible as the portion of the equalized pressure measurement corresponding to activations of a seismic source 250 in FIG. 2.

Figure 4:
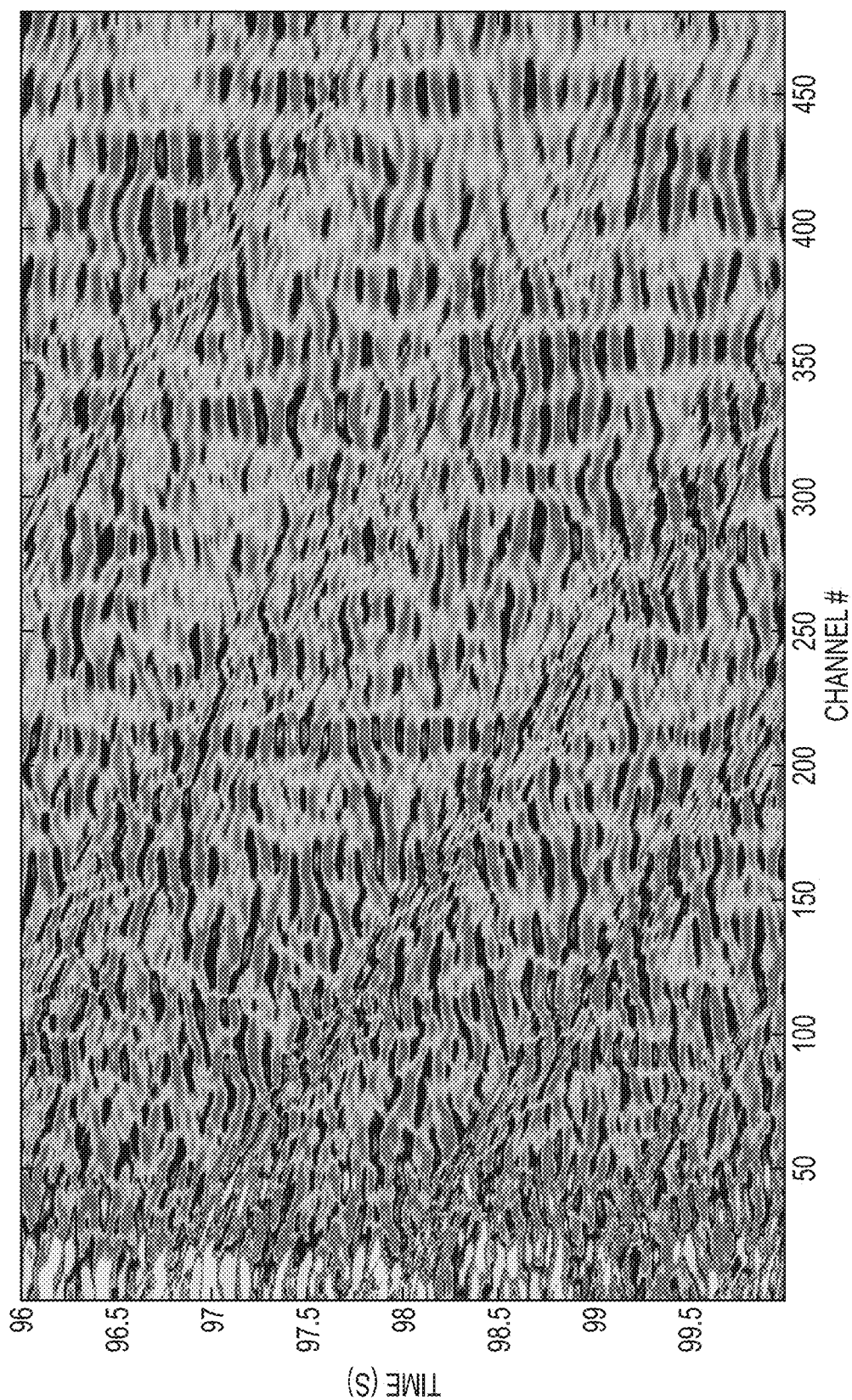
FIG. 4 illustrates a particle motion measurement that has been equalized.

FIG. 4 illustrates a particle motion measurement that has been equalized. In the example of FIG. 4, a ghost function corresponding to the pressure measurement and the pressure sensor response $S_p$ have been applied to the particle motion measurement of FIG. 3. The particle motion sensor response $S_{V_z}$ has been deconvolved. By comparing FIG. 4 to FIG. 2, it can be seen that the equalized particle motion measurement is noisier than the equalized pressure measurement. Also, the portion of the equalized particle motion measurement corresponding to activations of the seismic source in FIG. 4 are the same as the portion of the equalized pressure measurement corresponding to activations of the seismic source 250 in FIG. 2.

Figure 5:
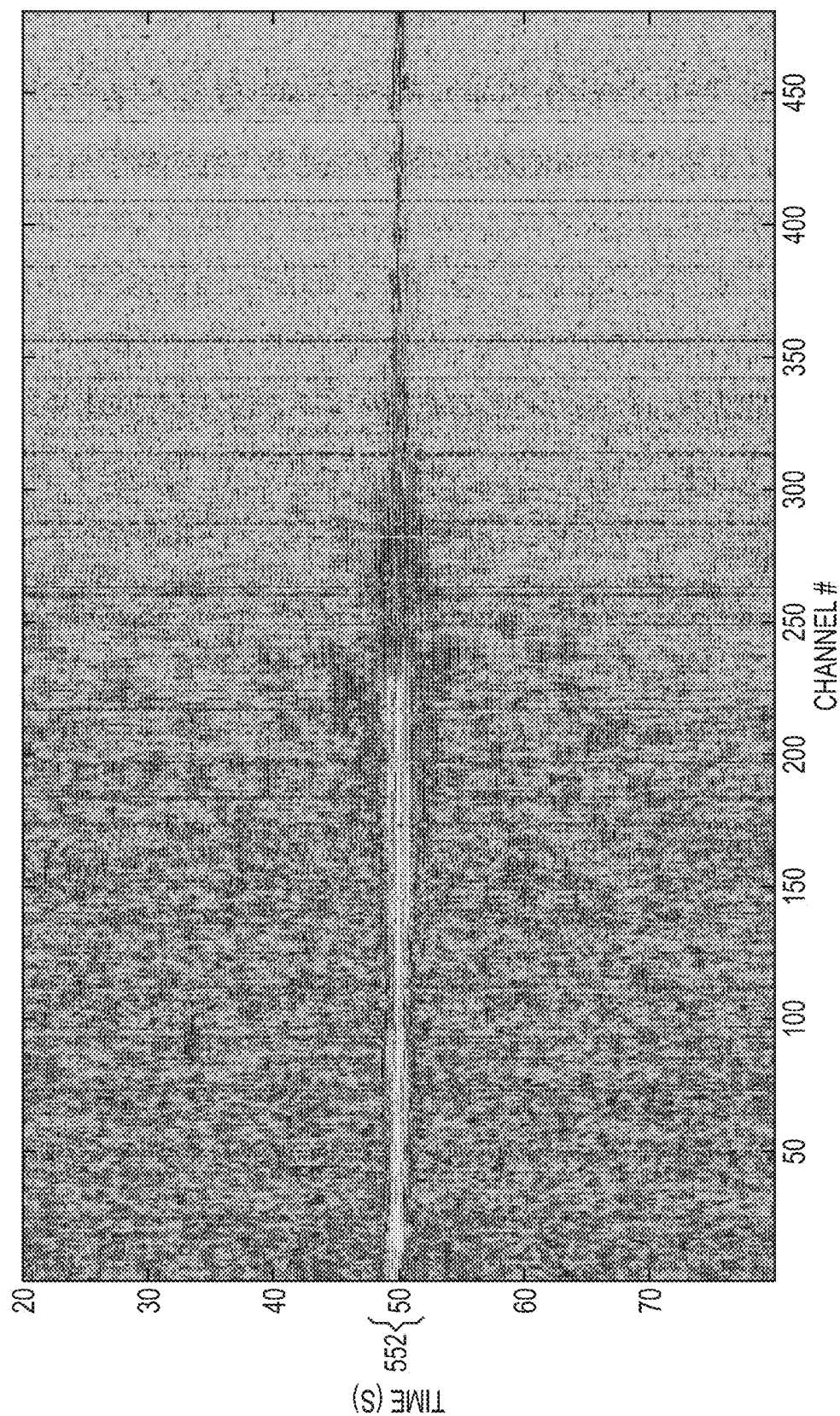
FIG. 5 illustrates an equalized particle motion measurement where the coherent portion has been collapsed.

The coherent portion of the equalized particle motion measurement can be collapsed. Collapsing can shift data from an entire marine seismic survey, potentially tens of thousands seconds' worth of data, to just a few seconds as shown in FIG. 5, described below. Collapsing can allow noise or the coherent portion to be isolated. A collapsing operator can be used to collapse the equalized particle motion measurement $\tilde{V}_z$ to a spike with amplitude A. The collapsing operator that collapses the coherent portion of the equalized particle motion measurement to a spike can be the inverse of the equalized pressure measurement $\tilde{P}$. Noise in the equalized particle motion measurement can remain spread out after the coherent portion is collapsed.

FIG. 5 illustrates an equalized particle motion measurement where the coherent portion has been collapsed. In the example of FIG. 5, an inverse of the equalized pressure measurement, illustrated in FIG. 2, has been convolved with the equalized particle motion measurement, illustrated in FIG. 4, such that the coherent portion of the equalized particle motion measurement has been collapsed to a spike 552 at approximately 50 seconds. That is, the coherent portion of the equalized particle measurement from the entire near-continuous marine seismic survey has been collapsed such that the majority, if not all, of the coherent portion of the equalized particle motion measurement is captured in FIG. 5 that shows only seconds 20 to 80. Although, the collapsing operator used in the example of FIG. 5 collapsed the equalized particle motion measurement to a spike at approximately 50 seconds, embodiments are not so limited. For example, a collapsing operator can be derived such that it will collapse the coherent portion of the equalized particle motion measurement to a time other than approximately 50 seconds.

After the coherent portion of the equalized particle motion measurement has been collapsed to a specified time, the collapsed coherent portion within a time window, placed around the specified time, can be muted. Muting the collapsed coherent portion can isolate noise in the equalized particle motion measurement, which can be used to derive a noise model. The collapsed coherent portion can be muted by applying a time window around a spike formed by the collapsing and muting the collapsed coherent portion within the time window. For example, if a spike is formed at 50 seconds, then a time window can be applied such that a first boundary of the time window is at 40 seconds and a second boundary of the time window is at 60 seconds, or 10 seconds on either side of the spike. The time window can be tapered, for example, with a time-variant taper, such that the amplitudes of the collapsed coherent portion near the first and second boundaries of the time window are decreased gradually. A tapered time window can avoid hard edges when muting.

Figure 6:
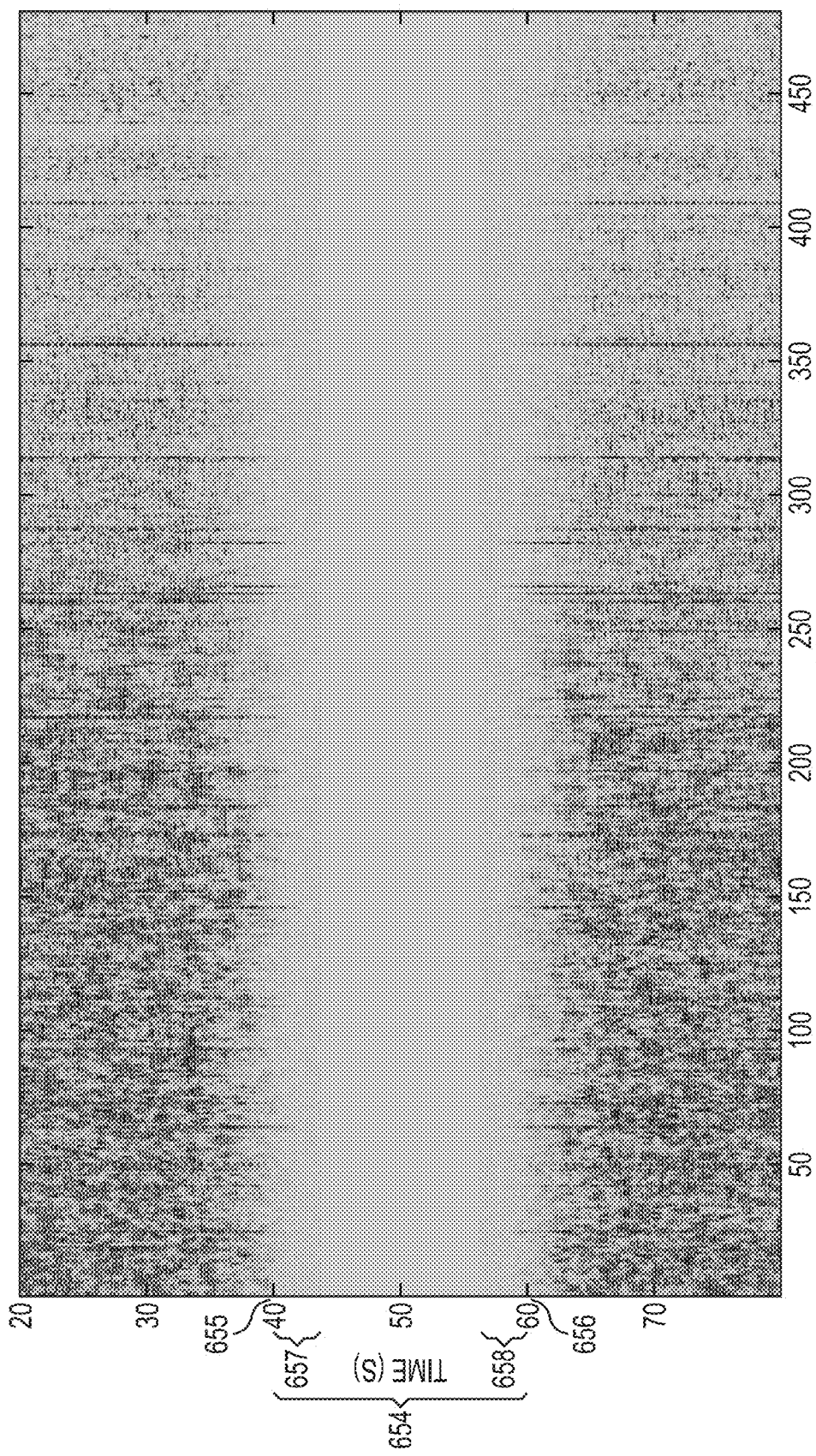
FIG. 6 illustrates an equalized particle motion measurement where the collapsed coherent portion has been muted.

FIG. 6 illustrates an equalized particle motion measurement where the collapsed coherent portion has been muted. In the example of FIG. 6, a time window 654 has been applied with a first boundary 655 at 40 seconds and a second boundary 656 at 60 seconds. The collapsed coherent portion within the time window has been muted. The time window 654 has a 2.5 second taper on each of the boundaries 655 and 656 such that in a first region 657 the muting effect is decreased from 42.5 seconds to 40 seconds and in a second region 658 the muting effect is decreased from 57.5 seconds to 60 seconds. Although the taper in FIG. 6 is 2.5 seconds long, embodiments are not so limited. Additionally, at least one embodiment can include tapering only one of the first and second boundaries of a time window. Although FIG. 6 shows a time window 654 having the first and second boundaries 655 and 656 equidistant from a spike, embodiments are not so limited. For example, the time window 654 in FIG. 6 could have a first boundary 655 at 40 seconds and a second boundary 656 at 55 seconds.

After the collapsed coherent portion of the equalized particle motion measurement has been muted, a noise model Ñ can be derived for the actual noise N in the particle motion measurement. The inverse of the collapsing operator can be applied to the muted particle motion measurement to derive the noise model Ñ. The noise model Ñ for the particle motion measurement can be derived by applying an inverting operator that can be an inverse of a ghost function and sensor responses applied in equation (8):

$$N = \frac{F_{vel}S_{V_z}}{S_p(1 - re^{-i2zk_z})}\tilde{N} = \Gamma\tilde{N} \quad (12)$$

If the ghost function or the sensor responses contains deep notches for example, resulting from cross-ghosting the pressure measurement and the particle motion measurement, it can be beneficial to stabilize the noise model by modifying equation (12) as follows:

$$N = \frac{\overline{\Gamma}}{|\Gamma|^2 + \varepsilon}\tilde{N} \quad (13)$$

where $\varepsilon$ is a stabilization parameter to avoid dividing by zero. The overbar denotes a complex conjugate.

In addition to the stabilization illustrated in equation (13), a portion of the spectrum where the equalized pressure measurement has a ghost notch can be muted. The ghost notch can be muted because the coherent portion of the pressure measurement is not in these parts of the spectrum. Pressure ghost notch frequencies are a function of wavenumbers and can be used to stabilize the de-ghosting of the cross-ghosted particle motion measurement. As discussed above, cross-ghosting the pressure measurement and the particle motion measurement can be used to equalize the pressure measurement and the particle motion measurement as well as to correct for differences in the sensor and array responses. An angular frequency of a ghost notch $\omega_{gn}$ can be a function of the horizontal wavenumbers $k_x$ and $k_y$ as follows $$\omega_{gn}(k_x, k_y) = c\sqrt{\left(\frac{n\pi}{2}\right)^2 + k_x^2 + k_y^2} \quad (14)$$

where n is the number of orders within the frequency range of the marine seismic survey data (for example, the pressure measurement or the particle motion measurement), c is the velocity of sound in water, z is the receiver depth, $k_x$ is a horizontal wavenumber in the inline direction, and $k_y$ is the horizontal wavenumber in the crossline direction. Equation (14) can be used to taper the noise model Ñ around one or more ghost notches. Equations (13) and (14) are two of several ways of stabilizing de-ghosting and embodiments are not so limited. Other ways of stabilizing de-ghosting include, but are not limited to, pre-whitening the de-ghosting operator and smoothing the de-ghosting operator.

In at least one embodiment in accordance with the present disclosure, instead of muting the collapsed coherent portion to derive a noise model as described above, the noise outside the time window 654 can be muted, leaving the collapsed coherent portion of the second near-continuous measurement within the time window 654, to derive a signal model. After muting the noise, an inverse of the collapsing operator can be applied to the signal model to uncollapse the collapsed coherent portion. After applying the inverse of the collapsing operator to the signal model, an inverse of the equalization operator can be applied to the uncollapsed signal model. After applying the inverse of the equalization operator to the uncollapsed signal model, the resulting unequalized signal model can be an approximation of the second near-continuous measurement with noise attenuated.

Figure 7:
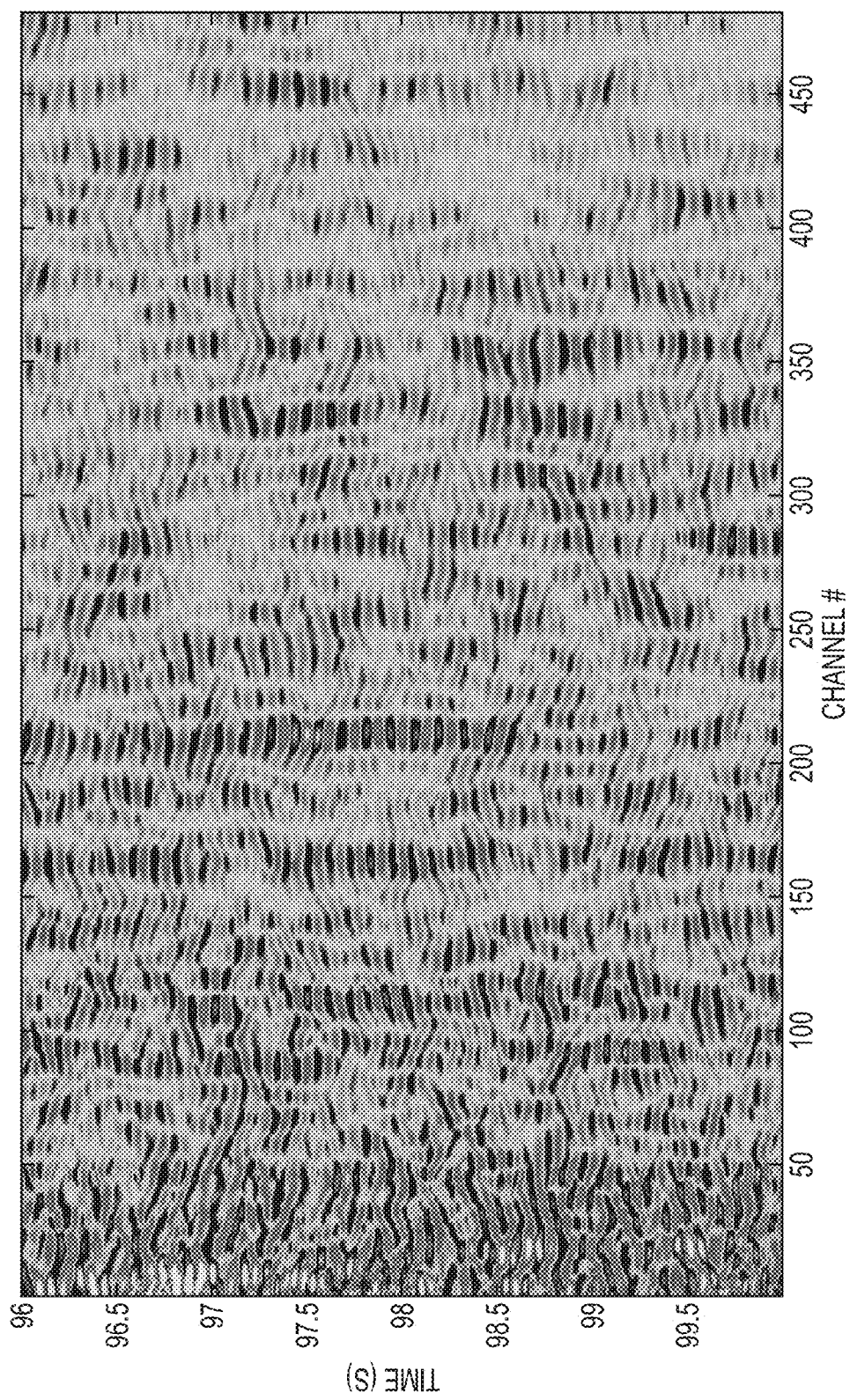
FIG. 7 illustrates a noise model.

FIG. 7 illustrates a noise model. The example of FIG. 7 illustrates a noise model derived from the equalized particle motion measurement after the collapsed coherent portion has been muted as illustrated in FIG. 6. As described above, the noise in the equalized particle motion measurement will remain spread out over time after muting the collapsed coherent portion. Thus, a noise model Ñ can be derived to attenuate noise in the particle motion measurement.

The noise model Ñ can be subtracted directly or adaptively from the particle motion measurement illustrated in FIG. 3. If the inverse of the collapsing operator and the equalization operator are accurate inverse operators of the forward operators, then the amplitude and phase response of the noise model can match that of the particle motion measurement. Thus, the noise model can be subtracted directly from the particle motion measurement. However, in practice, the inverse operators might not be perfectly accurate. For example, the inverse operators might be affected by stabilizing the de-ghosting operator as described above. The noise model can be subtracted adaptively from the particle motion measurement by using the following cost function:

$$\Sigma_{\omega_1}{}^{\omega_2}|D(\omega)-O\tilde{N}(\omega)|^2 \quad (15)$$

where D is the particle motion measurement, Ñ is the noise model, and O is an operator that is applied to the noise model Ñ. The operator O can be derived to minimize the value from the cost function (15) over the frequency range $\omega_1$ to $\omega_2$, thereby adapting the noise model to the data. The operator O can also be derived to minimize the value from the cost function (15) over a number of frequency ranges, which can be overlapping.

Figure 8:
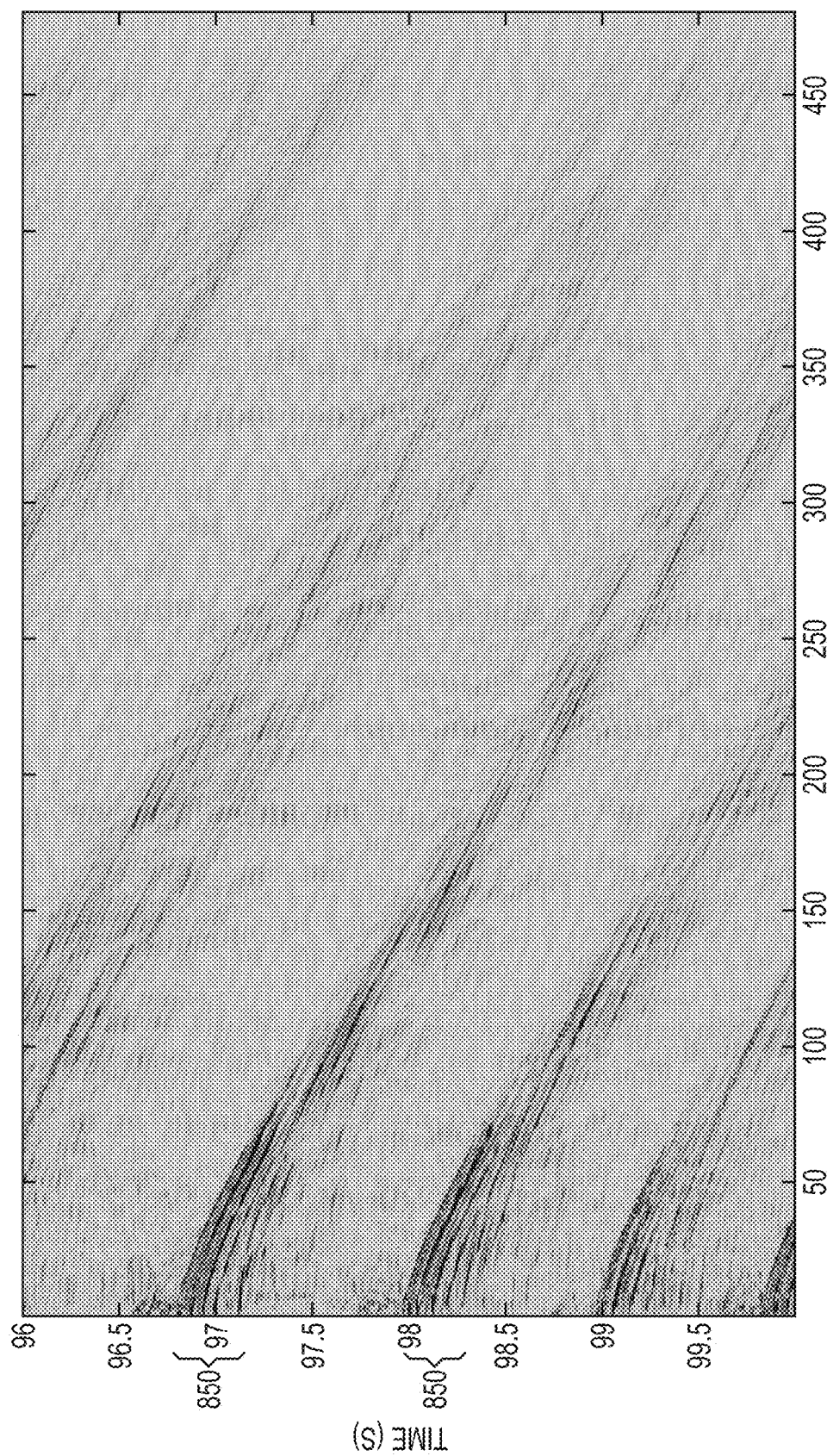
FIG. 8 illustrates a portion of a particle motion measurement after a noise model has been subtracted from a particle motion measurement.

FIG. 8 illustrates a portion of a particle motion measurement after a noise model has been subtracted from a particle motion measurement. After the noise model has been subtracted, the particle motion measurement illustrated in FIG. 8 is nearly identical to the equalized pressure measurement illustrated in FIG. 2. A comparison of FIG. 8 to FIG. 3 illustrates the noise in the particle motion measurement in FIG. 3 that has been attenuated. As in FIG. 3, activations of the seismic source 850 can now be seen clearly in the particle motion measurement illustrated in FIG. 8.

Figure 9:
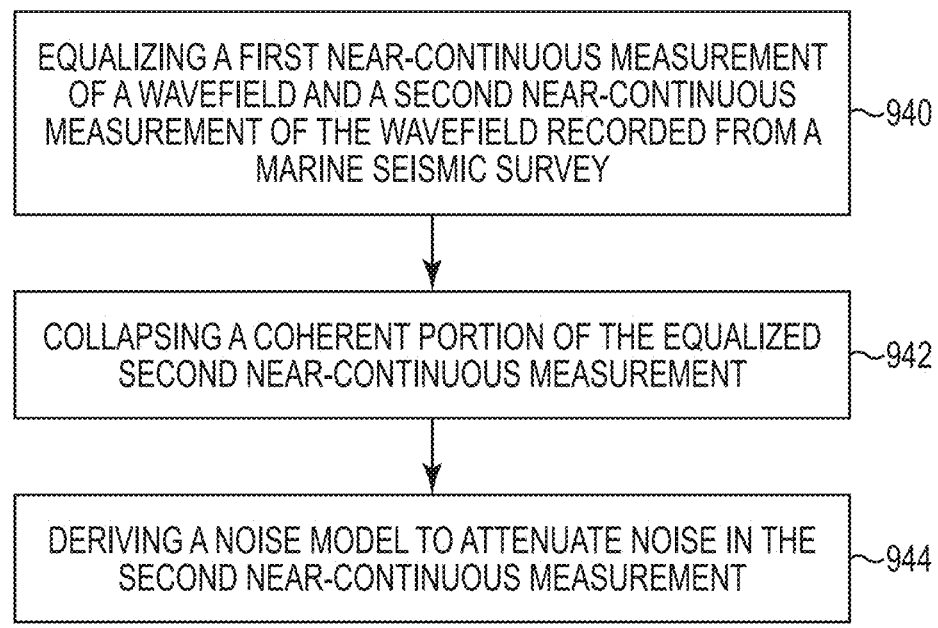
FIG. 9 illustrates a method flow diagram for attenuating noise in seismic data.

FIG. 9 illustrates a method flow diagram for attenuating noise. At block 940, the method can include equalizing a first near-continuous measurement and a second near-continuous measurement of a wavefield recorded from a marine seismic survey. An example of equalizing a first near-continuous measurement and a second near-continuous measurement is described above. Equalizing the first near-continuous measurement and the second near-continuous measurement can include cross-ghosting the first near-continuous measurement and the second near-continuous measurement, correcting a first response of the first near-continuous measurement to a second response of the second near-continuous measurement, and applying an obliquity of the second near-continuous measurement to the first near-continuous measurement. The first response can include an array response.

At block 942, the method can include collapsing a coherent portion of the equalized second near-continuous measurement resulting from block 940. An example of collapsing the coherent portion is described above. Collapsing the coherent portion of the equalized second near-continuous measurement can include inverting the equalized first near-continuous measurement, deriving a collapsing operator from the inverted first near-continuous measurement, and applying the collapsing operator to the equalized second near-continuous measurement. The coherent portion can be collapsed to a spike.

At block 944, the method can include deriving a noise model. An example of deriving a noise model from the muted equalized second near-continuous measurement is described above. Deriving the noise model can include applying a time window around the collapsed coherent portion of the equalized second near-continuous measurement and muting the collapsed coherent portion within the time window. The time window can be tapered. The collapsed coherent portion can be muted according to the taper. The noise model can be subtracted, directly or adaptively, from the second near-continuous measurement.

Although not shown in FIG. 9, a marine seismic survey can include a first near-continuous measurement, a second near-continuous measurement, and a third near-continuous measurement. In addition to the steps described above with respect to the first and second near-continuous measurements, embodiments can include equalizing the first near-continuous measurement and a third near-continuous measurement of the wavefield recorded from the marine seismic survey. A coherent portion of the equalized third near-continuous measurement can be collapsed. A different noise model can be derived to attenuate noise in the third near-continuous measurement.

Figure 10:
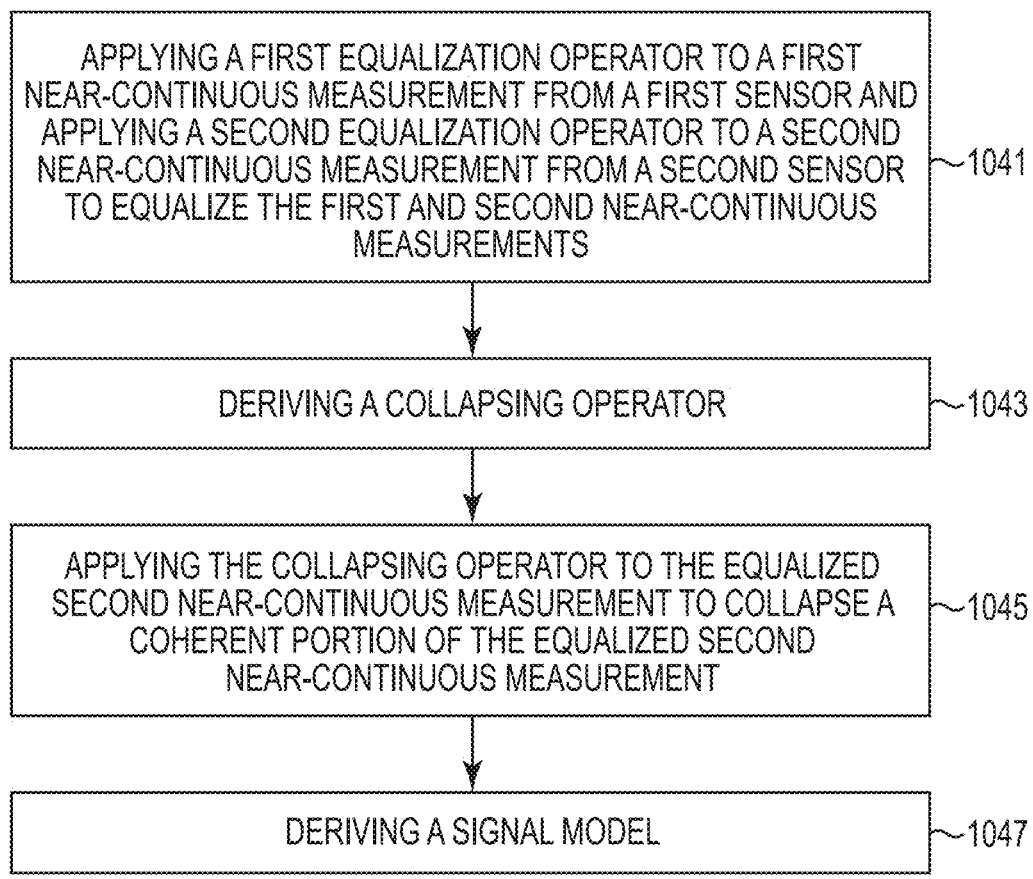
FIG. 10 illustrates a method flow diagram for attenuating noise in seismic data.

FIG. 10 illustrates a method flow diagram for attenuating noise in accordance with at least one embodiment of the present disclosure. At block 1041, the method can include equalizing a first near-continuous measurement from a first sensor in response to a wavefield and a second near-continuous measurement from a second sensor in response to the wavefield. The first and second near-continuous measurements can be equalized as described above, for example, with respect to FIGS. 2 and 4.

At block 1043, the method can include deriving a collapsing operator. The collapsing operator can be the same collapsing operator as described above, for example, with respect FIG. 5. Deriving the collapsing operator can include inverting the equalized first near-continuous measurement and deriving the collapsing operator from the inverted first near-continuous measurement.

At block 1045, the method can include applying the collapsing operator to the equalized second near-continuous measurement to collapse a coherent portion of the equalized second near-continuous measurement. The collapsing operator can be applied to the equalized second near-continuous measurement as described above, for example, with respect to FIG. 5.

At block 1047, the method can include deriving a signal model from the muted equalized second near-continuous measurement. To derive the signal model, a time window can be applied around the collapsed coherent portion of the equalized second near-continuous measurement. In contrast to embodiments described above, instead of muting the collapsed coherent portion within the time window as described above with respect to FIG. 6, the equalized second near-continuous measurement can be muted outside the time window. For example, instead of using a time window 654 to mute the spike as illustrated in FIGS. 5 and 6, noise outside the first and second boundaries 655 and 656 of the time window 654 can muted such that the spike 552 illustrated in FIG. 5 remains. Thus, the collapsed coherent portion within the time window can be isolated from the noise. From the isolated collapsed coherent portion, a signal model can be derived. The signal model can then be used to approximate the second near-continuous measurement.

Figure 11:
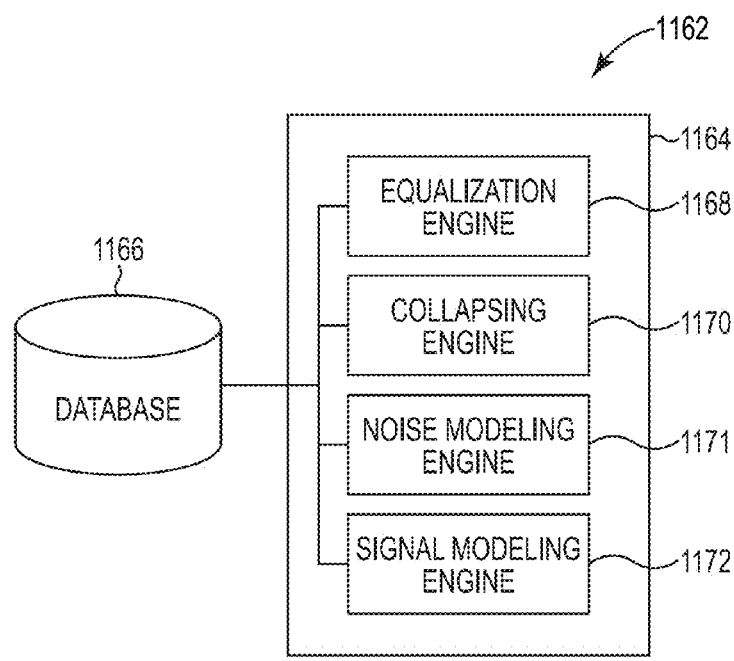
FIG. 11 illustrates a diagram of a system for attenuating noise in seismic data from a marine seismic survey.

FIG. 11 illustrates a diagram of a system 1162 for attenuating noise in seismic data from a marine seismic survey. The system 1162 can include a data store 1166, a subsystem 1164, and a number of engines, such as an equalization engine 1168, a collapsing engine 1170, a noise modeling engine 1171, and a signal modeling engine 1172. The subsystem 1164 and engines can be in communication with the data store 1166 via a communication link. The system 1162 can include additional or fewer engines than illustrated to perform the various functions described herein. The system can represent program instructions and/or hardware of a machine such as the machine 1274 referenced in FIG. 12, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The equalization engine 1168 can include a combination of hardware and program instructions that is configured to equalize the first near-continuous measurement and the second near-continuous measurement. The equalization can cause the equalized first near-continuous measurement and the equalized second near-continuous measurement to be related by a scalar. The equalization can be performed by at least one of the following: deconvolving the first near-continuous measurement and the second near-continuous measurement, correcting the second near-continuous measurement for an obliquity, or cross-ghosting the first near-continuous measurement and the second near-continuous measurement.

The collapsing engine 1170 can include a combination of hardware and program instructions that is configured to invert the equalized first near-continuous measurement and collapse a coherent portion of the equalized second near-continuous measurement.

The noise modeling engine 1171 can include a combination of hardware and program instructions that is configured to isolate noise in the equalized second near-continuous measurement from the collapsed coherent portion of the equalized second near-continuous measurement, derive a noise model from the isolated noise, and subtract the noise model from the second near-continuous measurement. The noise modeling engine 1171 can include a combination of hardware and program instructions that is further configured to apply an inverting operator to the isolated noise. The noise modeling engine 1171 can include a combination of hardware and program instructions that is further configured to mute a ghost notch in the collapsed second near-continuous measurement resulting from cross-ghosting the first near-continuous measurement and the second near-continuous measurement. The noise modeling engine 1171 can include a combination of hardware and program instructions that is further configured to apply a time window with a time variant taper around the collapsed coherent portion of the equalized second near-continuous measurement and mute the collapsed coherent portion within the time window to isolate the noise in the equalized second near-continuous measurement. The noise modeling engine 1171 can include a combination of hardware and program instructions that is further configured to stabilize the noise model by applying a stabilization parameter to the noise model.

The signal modeling engine 1172 can include a combination of hardware and program instructions that is configured to isolate the collapsed coherent portion of the equalized second near-continuous measurement from the noise in the equalized second near-continuous measurement and derive a signal model from the isolated collapsed coherent portion.

Figure 12:
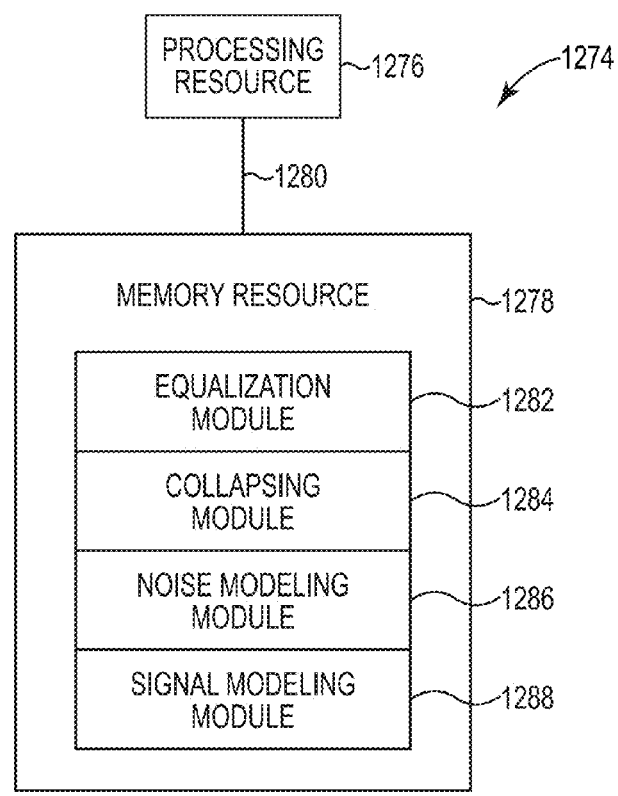
FIG. 12 illustrates a diagram of a machine for attenuating noise in seismic data from a marine seismic survey.

FIG. 12 illustrates a diagram of a machine 1274 for attenuating noise in seismic data from a marine seismic survey. The machine 1274 can utilize software, hardware, firmware, and/or logic to perform a number of functions. The machine 1274 can be a combination of hardware and program instructions configured to perform a number of functions. The hardware, for example, can include a number of processing resources 1276 and a number of memory resources 1278, such as a machine-readable medium or other non-transitory memory resources 1278. The memory resources 1278 can be internal and/or external to the machine 1274, for example, the machine 1274 can include internal memory resources and have access to external memory resources. The program instructions, such as machine-readable instructions, can include instructions stored on the machine-readable medium to implement a particular function, for example, an action such as attenuating noise in seismic data from a marine seismic survey. The set of machine-readable instructions can be executable by one or more of the processing resources 1276. The memory resources 1278 can be coupled to the machine 1274 in a wired and/or wireless manner. For example, the memory resources 1278 can be an internal memory, a portable memory, a portable disk, or a memory associated with another resource, for example, enabling machine-readable instructions to be transferred and/or executed across a network such as the Internet. As used herein, a "module" can include program instructions and/or hardware, but at least includes program instructions.

Memory resources 1278 can be non-transitory and can include volatile and/or non-volatile memory. Volatile memory can include memory that depends upon power to store data, such as various types of dynamic random access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and a solid state drive, etc., as well as other types of non-transitory machine-readable media.

The processing resources 1276 can be coupled to the memory resources 1278 via a communication path 1280. The communication path 1280 can be local or remote to the machine 1274. Examples of a local communication path 1280 can include an electronic bus internal to a machine, where the memory resources 1278 are in communication with the processing resources 1276 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1280 can be such that the memory resources 1278 are remote from the processing resources 1276, such as in a network connection between the memory resources 1278 and the processing resources 1276. That is, the communication path 1280 can be a network connection. Examples of such a network connection can include a local area network, wide area network, personal area network, and the Internet, among others.

As shown in FIG. 12, the machine-readable instructions stored in the memory resources 1278 can be segmented into a number of modules 1282, 1284, 1286, and 1288 that when executed by the processing resources 1276 can perform a number of functions. As used herein a module includes a set of instructions included to perform a particular task or action. The number of modules 1282, 1284, 1286, and 1288 can be sub-modules of other modules. For example, the collapsing module 1284 can be a sub-module of the equalization module 1282, the noise modeling module 1286 and the signal modeling module 1288 and the equalization module 1282 can be contained within a single module. Furthermore, the number of modules 1282, 1284, 1286, and 1288 can comprise individual modules separate and distinct from one another. Examples are not limited to the specific modules 1282, 1284, 1286, and 1288 illustrated in FIG. 12.

Each of the number of modules 1282, 1284, 1286, and 1288 can include program instructions or a combination of hardware and program instructions that, when executed by a processing resource 1276, can function as a corresponding engine as described with respect to FIG. 11. For example, the equalization module 1282 can include program instructions or a combination of hardware and program instructions that, when executed by a processing resource 1276, can function as the equalization engine 1168. The collapsing module 1284 can include program instructions or a combination of hardware and program instructions that, when executed by a processing resource 1276, can function as the collapsing engine 1170. The noise modeling module 1286 can include program instructions or a combination of hardware and program instructions that, when executed by a processing resource 1276, can function as the noise modeling engine 1171. The signal modeling module 1288 can include program instructions or a combination of hardware and program instructions that, when executed by a processing resource 1276, can function as the signal modeling engine 1172.

In accordance with a number of embodiments of the present disclosure, a geophysical data product may be produced. The geophysical data product may include, for example, a marine seismic survey measurement with an estimated acquisition effect removed therefrom. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, a first near-continuous measurement and a second near-continuous measurement of a wavefield from a marine seismic survey can be equalized, the equalized second near-continuous measurement can be collapsed, the collapsed second near-continuous measurement can be muted, a noise model can be derived from the muted second near-continuous measurement, and the noise model can be subtracted from the second near-continuous measurement. As another example, the noise attenuation can be performed directly from seismic data offshore to facilitate other processing of the acquired marine seismic survey measurement either offshore or onshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for attenuating noise in marine seismic survey data, comprising:
   receiving, by a machine, marine seismic survey data recorded near-continuously by a plurality of receivers, wherein the near-continuously recorded seismic data is indicative of a subterranean formation and includes a first near-continuous measurement of a wavefield and a second near-continuous measurement of the wavefield;
   equalizing the first near-continuous measurement of a wavefield and the second near-continuous measurement of the wavefield recorded from a marine seismic survey;
   collapsing a coherent portion of the equalized second near-continuous measurement by:
      inverting the equalized first near-continuous measurement;
      deriving a collapsing operator from the inverted first near-continuous measurement; and
      applying the collapsing operator to the equalized second near-continuous measurement;
   deriving a noise model; and
   attenuating noise in the second near-continuous measurement using the noise model.

2. The method of claim 1, wherein equalizing the first near-continuous measurement and the second near-continuous measurement comprises:
   cross-ghosting the first near-continuous measurement and the second near-continuous measurement;
   correcting a first response of the first near-continuous measurement to a second response of the second near-continuous measurement; and
   applying an obliquity of the second near-continuous measurement to the first near-continuous measurement.

3. The method of claim 2, wherein correcting the first response to the second response comprises including an array response in the first response.

4. The method of claim 1, wherein collapsing the coherent portion comprises collapsing the coherent portion of the equalized second near-continuous measurement to a spike.

5. The method of claim 1, wherein deriving the noise model comprises:
applying a time window around the collapsed coherent portion; and
muting the collapsed coherent portion of the equalized second near-continuous measurement within the time window.

6. The method of claim 5, further comprising:
tapering the time window; and
muting the collapsed coherent portion according to the tapering.

7. The method of claim 1, wherein attenuating the noise in the second near-continuous measurement includes subtracting the noise model directly from the second near-continuous measurement.

8. The method of claim 1, wherein attenuating the noise in the second near-continuous measurement includes subtracting the noise model adaptively from the second near-continuous measurement.

9. The method of claim 1, further comprising filtering an evanescent region of the wavefield represented in the first near-continuous measurement and the second near-continuous measurement prior to equalizing the first near-continuous measurement and the second near-continuous measurement.

10. The method of claim 1, further comprising:
acquiring the first near-continuous measurement with a first sensor; and
acquiring the second near-continuous measurement with a second sensor,
wherein the first sensor is of a different type than the second sensor.

11. The method of claim 1, further comprising:
equalizing the first near-continuous measurement and a third near-continuous measurement of the wavefield recorded from the marine seismic survey;
collapsing a coherent portion of the equalized third near-continuous measurement; and
deriving a different noise model to attenuate noise in the third near-continuous measurement.

12. The method of claim 11, further comprising:
acquiring the first near-continuous measurement with a first sensor;
acquiring the second near-continuous measurement with a second sensor; and
acquiring the third near-continuous measurement with a third sensor,
wherein the first sensor is of a different type than the second sensor.

13. A method for attenuating noise in marine seismic survey data, comprising:
receiving, by a machine, marine seismic survey data recorded near-continuously by a plurality of sensors, wherein the near-continuously recorded seismic data is indicative of a subterranean formation and includes a first near-continuous measurement of a wavefield and a second near-continuous measurement of the wavefield;
applying a first equalization operator to the first near-continuous measurement and applying a second equalization operator to the second near-continuous measurement to equalize the first near-continuous measurement and the second near-continuous measurement;
deriving a collapsing operator;
applying the collapsing operator to the equalized second near-continuous measurement to collapse a coherent portion of the equalized second near-continuous measurement;
deriving a signal model;
applying an inverse of the collapsing operator to the signal model to uncollapse the signal model; and
applying an inverse of the second equalization operator to the uncollapsed signal model to yield an approximation of the second near-continuous measurement with noise attenuated.

14. The method of claim 13, wherein deriving the collapsing operator comprises:
inverting the equalized first near-continuous measurement; and
deriving the collapsing operator from the inverted first near-continuous measurement.

15. The method of claim 13, wherein deriving the signal model comprises:
applying a time window around the collapsed coherent portion; and
muting the equalized second near-continuous measurement outside the time window.

16. The method of claim 13, further comprising applying the collapsing operator to the equalized first near-continuous measurement to collapse a coherent portion of the equalized first near-continuous measurement.

17. The method of claim 13, further comprising:
acquiring the first near-continuous measurement with a first sensor; and
acquiring the second near-continuous measurement with a second sensor,
wherein the first sensor is of a different type than the second sensor.

18. A system for attenuating noise in marine seismic survey data, comprising:
a processing resource; and
a memory resource coupled to the processing resource, wherein the memory resource stores instructions executable by the processing resource to:
receive recorded marine seismic survey data comprising a first near-continuous measurement of a wavefield and a second near-continuous measurement of the wavefield;
equalize the first near-continuous measurement and the second near-continuous measurement;
invert the equalized first near-continuous measurement;
collapse a coherent portion of the equalized second near-continuous measurement;
isolate noise in the equalized second near-continuous measurement from the collapsed coherent portion;
derive a noise model from the isolated noise;
subtract the noise model from the second near-continuous measurement to attenuate noise in the second near-continuous measurement; and
isolate the collapsed coherent portion from the noise in the equalized second near-continuous measurement to attenuate noise in the second near-continuous measurement; and
derive a signal model from the isolated collapsed coherent portion.

19. The system of claim 18, further comprising instructions executable to equalize the first near-continuous measurement and the second near-continuous measurement such that the equalized first near-continuous measurement and the equalized second near-continuous measurement are related by a scalar.

20. The system of claim 18, further comprising instructions executable to deconvolve the first near-continuous measurement and the second near-continuous measurement to equalize the first near-continuous measurement and the second near-continuous measurement.

21. The system of claim 18, further comprising instructions executable to correct the second near-continuous measurement for an obliquity to equalize the first near-continuous measurement and the second near-continuous measurement.

22. The system of claim 18, further comprising instructions executable to cross-ghost the first near-continuous measurement and the second near-continuous measurement to equalize the first near-continuous measurement and the second near-continuous measurement.

23. The system of claim 22, further comprising instructions executable to mute a ghost notch in the collapsed coherent portion of the equalized second near-continuous measurement resulting from the cross-ghosting of the first near-continuous measurement and the second near-continuous measurement.

24. The system of claim 18, further comprising instructions executable to apply an inverting operator to the isolated noise.

25. The system of claim 18, further comprising instructions executable to:
apply a time window with a time variant taper around the collapsed coherent portion of the equalized second near-continuous measurement; and
mute the collapsed coherent portion within the time window to isolate the noise in the equalized second near-continuous measurement.

26. The system of claim 18, further comprising instructions executable to stabilize the noise model by applying a stabilization parameter to the noise model.

27. The system of claim 18, wherein the first near-continuous measurement is a pressure measurement of the wavefield; and
wherein the second near-continuous measurement is a particle motion measurement of the wavefield.

28. A method of generating a geophysical data product, the method comprising:
obtaining geophysical data including a first near-continuous measurement of a wavefield and a second near-continuous measurement of the wavefield;
processing the geophysical data to generate processed data, wherein processing the geophysical data comprises:
equalizing the first near-continuous measurement and the second near-continuous measurement;
collapsing a coherent portion of the equalized second near-continuous measurement by:
inverting the equalized first near-continuous measurement;
deriving a collapsing operator from the inverted first near-continuous measurement; and
applying the collapsing operator to the equalized second near-continuous measurement;
muting the collapsed coherent portion;
deriving a noise model; and
subtracting the noise model from the second near-continuous measurement to attenuate noise in the second near-continuous measurement; and
recording the processed data on a non-transitory machine-readable medium thereby creating the geophysical data product.

29. The method of claim 28, wherein processing the geophysical data comprises processing the geophysical data offshore or onshore.

* * * * *